United States Patent [19]
Partington

[11] Patent Number: 5,196,158
[45] Date of Patent: Mar. 23, 1993

[54] ELECTRICAL SAFETY SYSTEM
[75] Inventor: Simon Partington, Manchester, England
[73] Assignee: NNC Limited, England
[21] Appl. No.: 822,123
[22] Filed: Jan. 17, 1992
[30] Foreign Application Priority Data
Jan. 18, 1991 [GB] United Kingdom ............... 9101146
[51] Int. Cl.[5] .............................................. G21C 7/36
[52] U.S. Cl. .................................... 376/216; 371/36; 364/492; 376/259
[58] Field of Search .............. 376/216, 215, 259, 228; 364/492, 527; 371/36; 976/DIG. 299, DIG. 301

[56] References Cited
U.S. PATENT DOCUMENTS

| 4,664,870 | 5/1987 | Hager | 376/215 |
| 4,696,785 | 9/1987 | Cook et al. | 376/215 |
| 4,957,690 | 9/1990 | Fennern | 376/216 |

FOREIGN PATENT DOCUMENTS
1600533 10/1981 United Kingdom .

Primary Examiner—Daniel D. Wasil
Attorney, Agent, or Firm—Kirschstein, Ottinger, Israel & Schiffmiller

[57] ABSTRACT

In an electrical safety system primarily for controlling the insertion of absorber rods into a nuclear reactor core in response to a trip signal, two groups of switches are connected between a power supply and the rod magnets. One group of switches is controlled by signal converters which receive input signals from respective guardlines. The other group of switches is controlled by opto-isolator/photo-detector links which also receive the input signals from the guardlines. If fault conditions in the reactor are sensed by more than one of a group of fault sensors, the feeding of the input signals to the signal converters and the optical links is inhibited, and the switches open, thereby deenergizing the magnets.

8 Claims, 4 Drawing Sheets

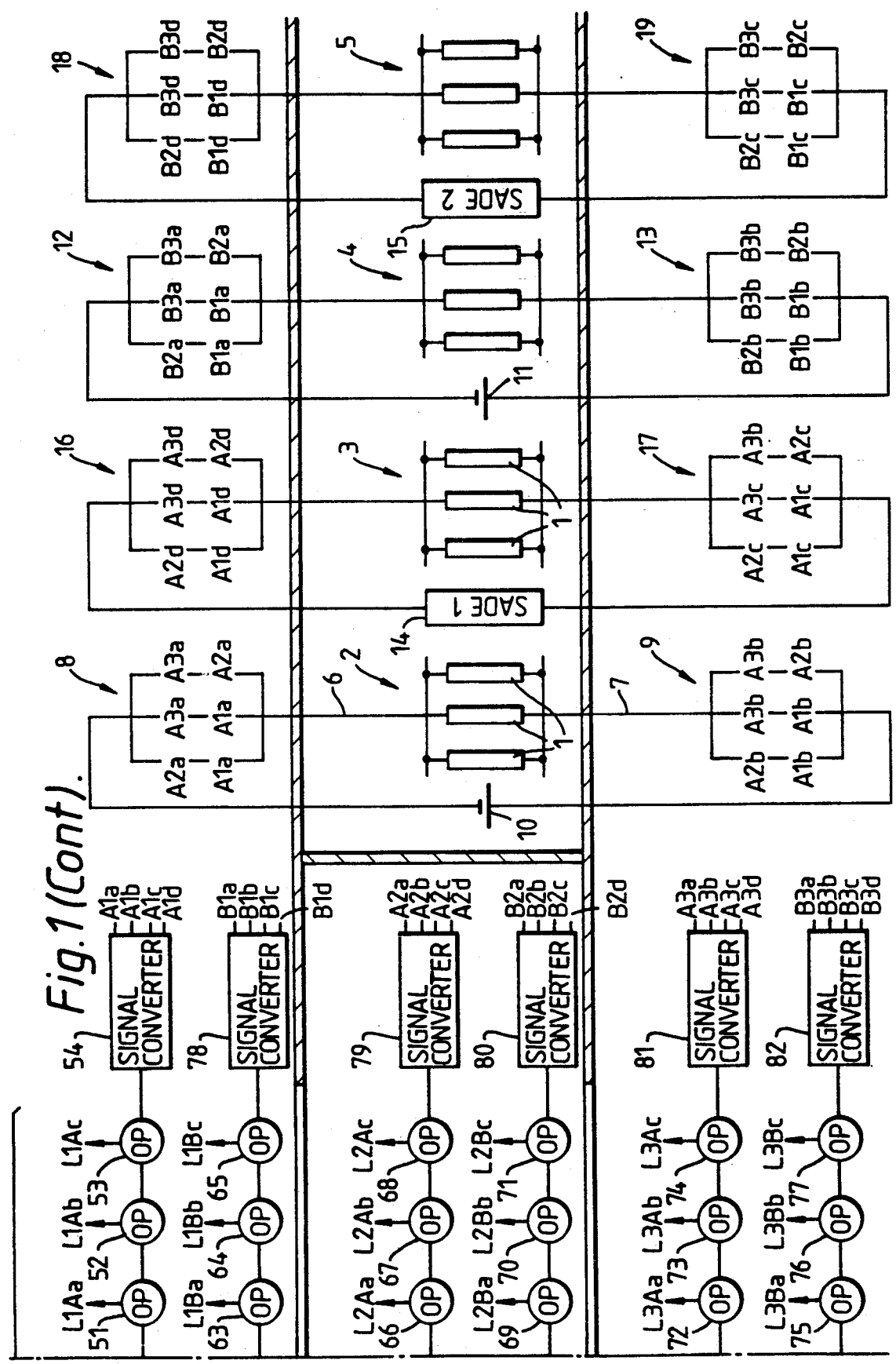

ELECTRICAL SAFETY SYSTEM

This invention relates to an electrical safety system and particularly, but not exclusively, to an electrical safety system for ensuring that all of the absorber rods are inserted into a nuclear reactor core on occurrence of a reactor trip signal.

In order to ensure safe operation of a nuclear power station it is essential that, in the event of a trip signal being generated in response to a malfunction in the reactor, the electrical circuitry controlling the insertion of the absorber rods shall operate correctly to insert all of the rods into the core.

The insertion of the absorber rods is controlled by electromagnets all or most of which must become deenergised in the event of a trip signal being produced.

Figure 1:
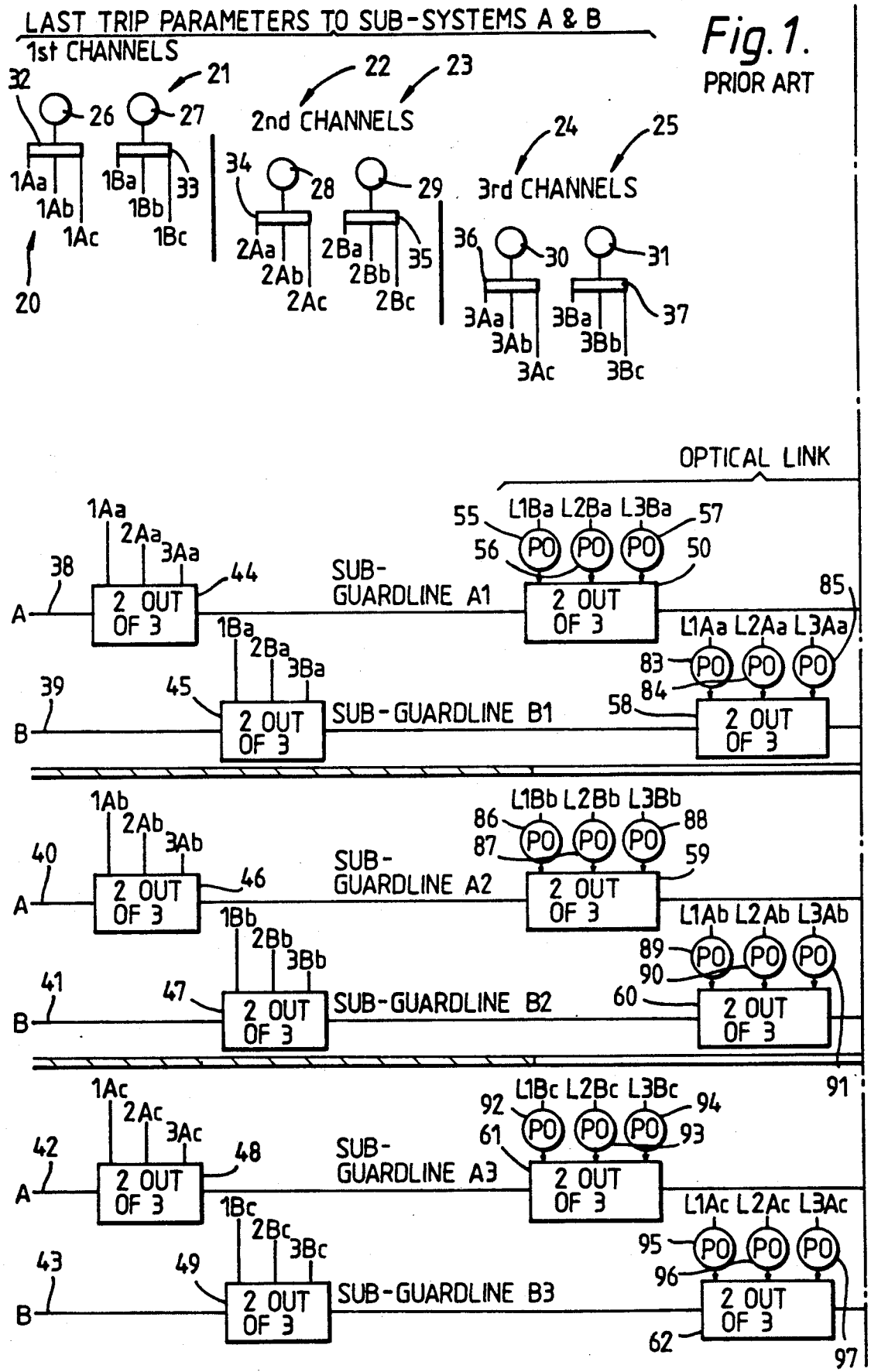

FIG. 1 of the accompanying drawings illustrates, schematically, a known system for effecting this deenergisation of the absorber rods magnets. The magnets, which are represented by blocks 1, are connected in parallel in groups 2, 3, 4 and 5. The rods controlled by the magnet groups 2 and 4 are control-and-shutdown rods which are sued for control purposes under normal reactor operating conditions and which are dropped fully into the core under emergency conditions. The rods controlled by the magnet groups 3 and 5 are shutdown rods which are used solely in emergency conditions.

The magnet group 2 is connected via lines 6 and 7 and switch groups 8 and 9 to a battery supply 10 of the reactor's emergency power system. Each switch group comprises six switches which are closed during normal operation of the system and which are connected in three parallel groups, each comprising two series-connected switches. The switches may be electromagnetic devices, such as relays, or may be solid-state devices, such as power transistors. Each switch must be of a type such that a voltage must be applied thereto in order to maintain conduction through the switch. The switch groups are known as "6-contact" systems. Gate turn-off silicon controlled rectifiers might be used as the switches, but an alternating current supply would then be needed, in place of the supplies 10, 11, 14 and 15, so that the switching devices would turn off on removal of the gate signal.

The magnet group 4 is similarly supplied by a battery 11 via switch groups 12 and 13 of the 6-contact type.

The magnet groups 3 and 5 are energised by power supplies 14 and 15, respectively, via switch groups 16, 17 and 18, 19, respectively. The power supplies 14, 15 are derived from one or more generators driven by, for example, the coolant pump drive shafts, so that, in the event of pump failure, the power supply voltage will fall to zero in a few seconds, as determined by the momentum of the rotating pump and the generator coupled thereto.

The switches of the groups 8, 9, 12, 13, 16, 17, 18 and 19 are indicated in FIG. 1 by reference to the control signals which are used to close the switches. For example, the contacts of the switch group 8 are closed by signals A1a, A1a, A2a, A2a, A3a and A3a, respectively, the arrangement being such that the three series pairs together cover all combinations of two out of the three control signals for the group. Combinations of different control signals operate the other switch groups, as shown. Each group constitutes, in effect, a two-out-of-three voting circuit. The switch arrangement allows testing of the system during normal operation of the reactor.

The control signals are derived from three control channel pairs 20, 21; 22, 23; and 24, 25, respectively. The control channels 20, 22 and 24 derive control signals from sensors 26, 28 and 30, respectively, which sense a parameter, for example core temperature, at three different locations in the core. The control channels 21, 3 and 25 derive control signals from sensors 27, 29 and 31, respectively, which sense another parameter, for example neutron flux, at three different locations in the core. In response to normal outputs from the sensors, rip units 32, 33, 34, 35, 36 and 37 each produce parallel output signals on three output lines, designated 1Aa, 1Ab, 1Ac; 1Ba, 1Bb, 1Bc; 2Aa, 2Ab, 2Ac; and so on, as illustrated. If any of the sensors detect an abnormal core condition, or if any of the input or output lines of the trip units go open-circuit, the corresponding output signal or signals will become zero.

The system also includes three pairs of sub-guardlines 38, 39; 40, 41; and 42, 43. The sub-guardlines carry signals which indicate that the sensed operating conditions in the reactor core are normal. Under normal reactor operating conditions, continuous square-wave signals are applied to all of the sub-guardlines from one or more signal generators. A respective two-out-of-three voting circuit 44, 45, 46, 47, 48, 49 is connected in each sub-guardline. The voting circuits are controlled by the output signals from the trip units 32 to 37, the voting circuit 44 being controlled by output signals 1Aa, 2Aa, and 3Aa from the trip units 32, 34 and 36. The other voting circuits are correspondingly controlled, as illustrated. In the event of a single input signal to a voting circuit becoming zero, the square-wave signal will still appear at the output of the voting circuit. However, if two or three voting circuit input signals become zero, the square-wave signal will no longer appear at the output of the voting circuit.

To the output of the voting circuit 44 a further two-out-of-three voting circuit 50 is connected, followed by three series-connected opto-isolators 51, 52 and 53, and a signal converter 54. The voting circuit 50 is controlled by three photo-diodes 55, 56 and 57. Similar arrangements of voting circuits 58–62, opto-isolators 63–77, signal converters 78–82, and photo-diodes 83–97 are provided for the other sub-guardlines. The photo-diodes controlling each voting circuit 55, 58, 59, 60, 61 and 62 are connected by an optical link to the opto-isolators of three of the other sub-guardlines, so that tripping of any one sub-guardline will trip the other sub-guardlines. The signal converters 54 and 78–82 provide the d.c. voltages A1a, A2a, A3a, etc. for turning on the switch groups 8, 9, 12, 13, 16, 17, 18 and 19 as described above.

In operation of the system of FIG. 1, under normal reactor operating conditions all of the switch contacts will be closed and the magnets will therefore all be energised. If any two of the sensors 26, 28 and 30 or any two of the sensors 27, 29 and 31 detect fault conditions, each of the signal converters 54, 78 and 79 or 80–82, respectively, will lose their square-wave inputs, and their outputs will fall to zero. The switches of the switch groups will therefore all become de-energised, allowing all of the absorber rods to drop into the core. The use of the voting circuits ensures that spurious single faults do not cause de-energisation of the magnets.

Disadvantages of the known system of FIG. 1 are that it relies on correct operation of the signal converters and at least one out of two of the switch groups in each of the absorber rod electromagnet circuits.

It is an object of the present invention to provide an improved electrical safety system.

According to the invention there is provided an electrical safety system for de-energising a load in response to a plurality of fault conditions occurring simultaneously, the system comprising first and second groups of electrically-operated switches connected between the load and a load-energising supply; a plurality of guardlines to which are applied input signals; a plurality of opto-isolators connected to each guardline to produce optical signals in response to said input signals; a respective signal converter connected to each guardline and responsive to said input signal on the respective guardline to cause energisation of said first group of switches; a plurality of photo-detectors optically coupled to respective ones of the opto-isolators and responsive to said input signals to cause energisation of said second group of switches; a plurality of sensors for sensing said fault conditions; and means responsive to the sensing of fault conditions by more than one of the sensors to inhibit the feeding of said input signals to the opto-isolators and the signal converters, whereby the groups of switches become non-conductive and cause de-energisation of the load.

The load may comprise a plurality of electromagnets for supporting absorber rods in a nuclear reactor.

An embodiment of the invention will now be described, by way of example, with reference to the accompanying drawings, in which FIG. 1 is a schematic block diagram of a known safety circuit for controlling the dropping of absorber rods into the core of a nuclear reactor, as described above, and FIG. 2 is a schematic block diagram of a safety circuit in accordance with the invention of controlling the dropping of absorber rods into the core of a nuclear reactor.

Figure 2:
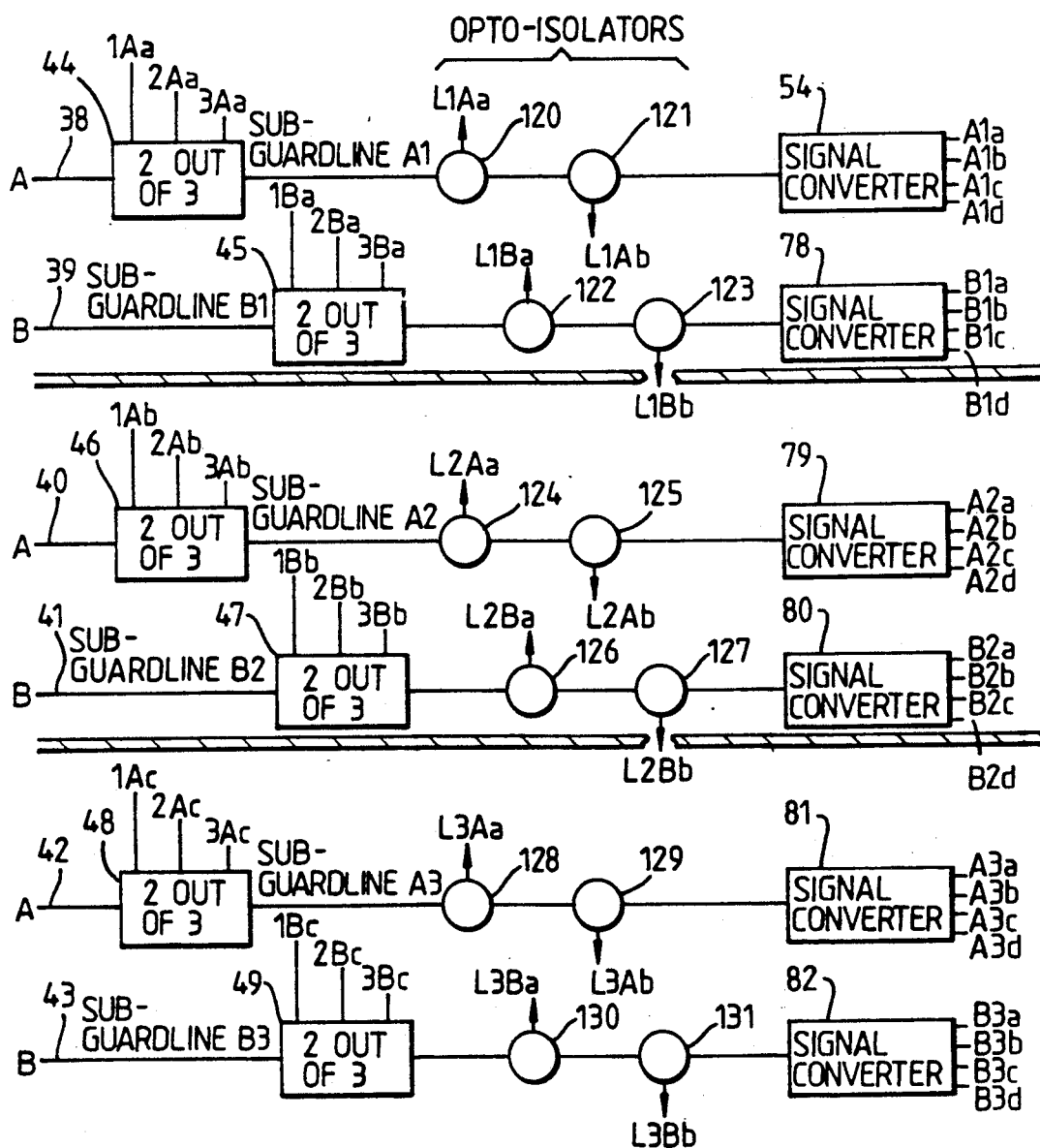
Figure 2:
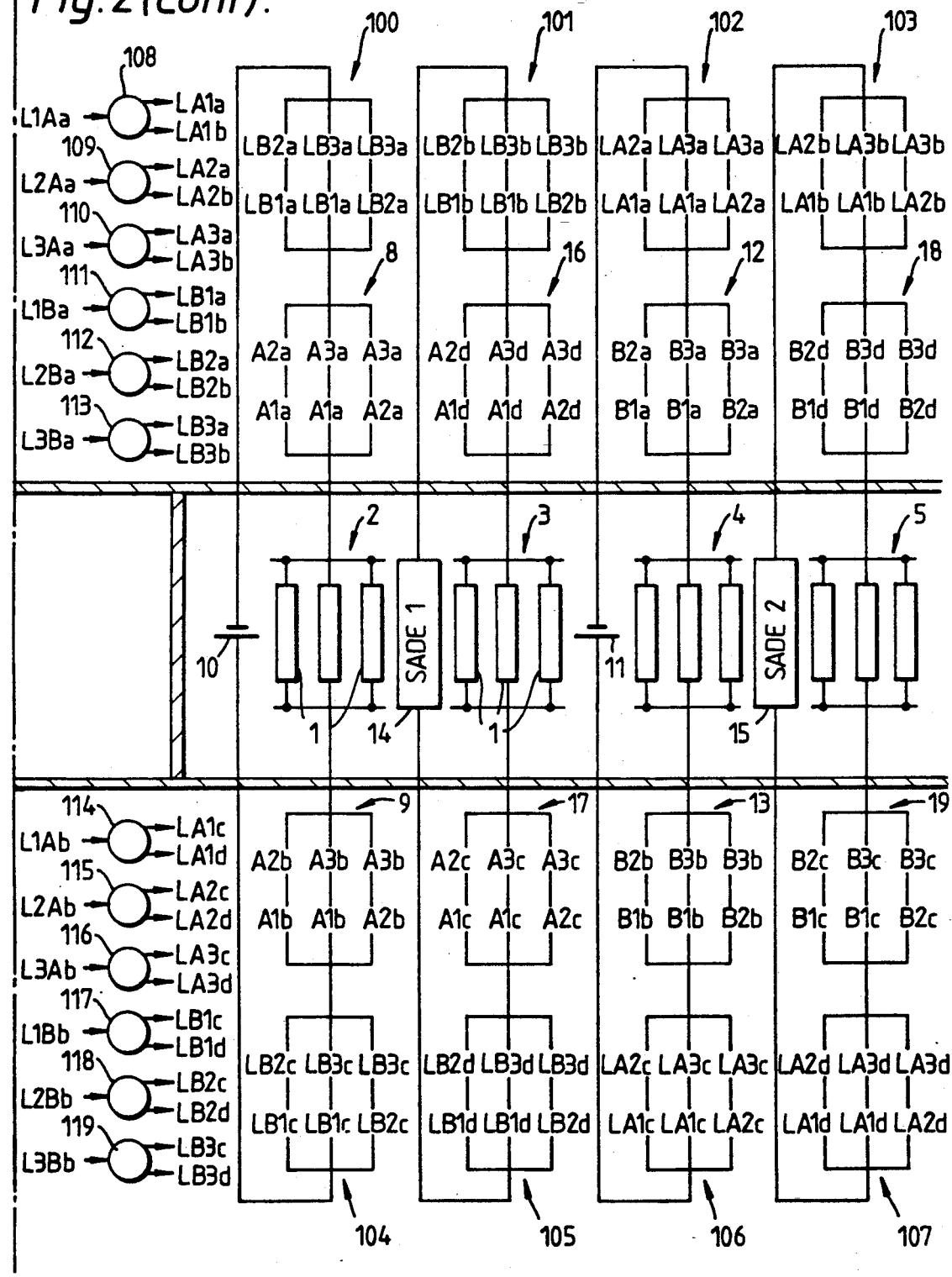

Referring to FIG. 2 of the drawings, in which components corresponding to those of FIG. 1 have the same reference numerals as in FIG. 1, the circuit is modified by the inclusion of additional 6-contact switch groups 100–107 in series with the switch groups 8, 9, 16, 17, 12, 13, 18 and 19. These additional switch groups are operated by signals from photodiodes 108–199. The voting circuit 50, the opto-isolators 51–53 and the photodiodes 55–57 of FIG. 1 are omitted from the sub-guardline 38, and two opto-isolators 120, 121 are substituted. The light outputs of these opto-isolators are optically coupled to respective photodiodes 108 and 114, as shown. Similarly, opto-isolators 122–131 are connected to the other sub-guardlines 39–43.

It will be seen that, as compared with the FIG. 1 system, six voting circuits are omitted, and there are six opto-isolators and six photodiodes fewer in the FIG. 2 system. Furthermore, the doubling of the number of switch groups gives even greater redundancy than in FIG. 1, so that the FIG. 2 system is far less dependent upon absolute reliability of the switch groups. The FIG. 1 system relies on correct operation of the signal converters to control the switch groups, whereas in the FIG. 2 system the additional switch groups are controlled by the photodiodes 108–119 and the opto-isolators 12–131, so totally reliable operation of the signal converters is not essential.

The present invention therefore provides a safer and more economical system for inserting all of the absorber rods into the core in response to a trip signal on either of the guardlines.

Although the invention has been described in relation to its application in a nuclear reactor, it may be used for ensuring safe de-energisation of any type of load in response to fault conditions.

I claim:

1. An electrical safety system for de-energising a load in response to a plurality of fault conditions occurring simultaneously, the system comprising first and second groups of electrically-operated switches connected between the load and a load-energising supply; a plurality of guardlines to which are applied input signals; a plurality of opto-isolators connected to each guardline to produce optical signals in response to said input signals; a respective signal converter connected to each guardline and responsive to said input signal on the respective guardline to cause energisation of said first group of switches; a plurality of photo-detectors optically coupled to respective ones of the opto-isolators and responsive to said input signals to cause energisation of said second group of switches; a plurality of sensors for sensing said fault conditions; and means responsive to the sensing of fault conditions by more than one of the sensors to inhibit the feeding of said input signals to the opto-isolators and the signal converters, whereby the groups of switches become non-conductive and cause de-energisation of the load.

2. A system as claimed in claim 1, wherein each switch group comprises six switches all of which are closed for normal energisation of the load; wherein the switches of each group are connected in a series/parallel arrangement comprising three sets of switches connected in parallel, each set comprising two switches connected in series; and wherein each switch group is operable to act as a two-out-of-three voting circuit.

3. A system as claimed in claim 2, wherein each switch is an electromagnetically-operated switch.

4. A system as claimed in claim 2, wherein each switch is a solid-state switch.

5. A system as claimed in claim 1, wherein the means to inhibit the feeding of the input signals comprises a respective voting circuit for each guardline, each voting circuit being responsive to a different combination of signals derived from outputs of the sensors.

6. A system as claimed in claim 1, comprising two of said first groups and two of said second groups of switches connected in series between the load and the load-energising supply; and a respective plurality of said opto-isolators and photo-detectors for each of said second groups of switches.

7. A system as claimed in claim 1, wherein the load comprises a plurality of electromagnets for withholding absorber rods from the core of a nuclear reactor.

8. A system as claimed in claim 7, wherein the sensors are operative to sense parameters within the core.

* * * * *